Aug. 15, 1933.      R. C. HUGHES      1,922,954
FLUID PRESSURE REGULATOR
Filed Dec. 30, 1931
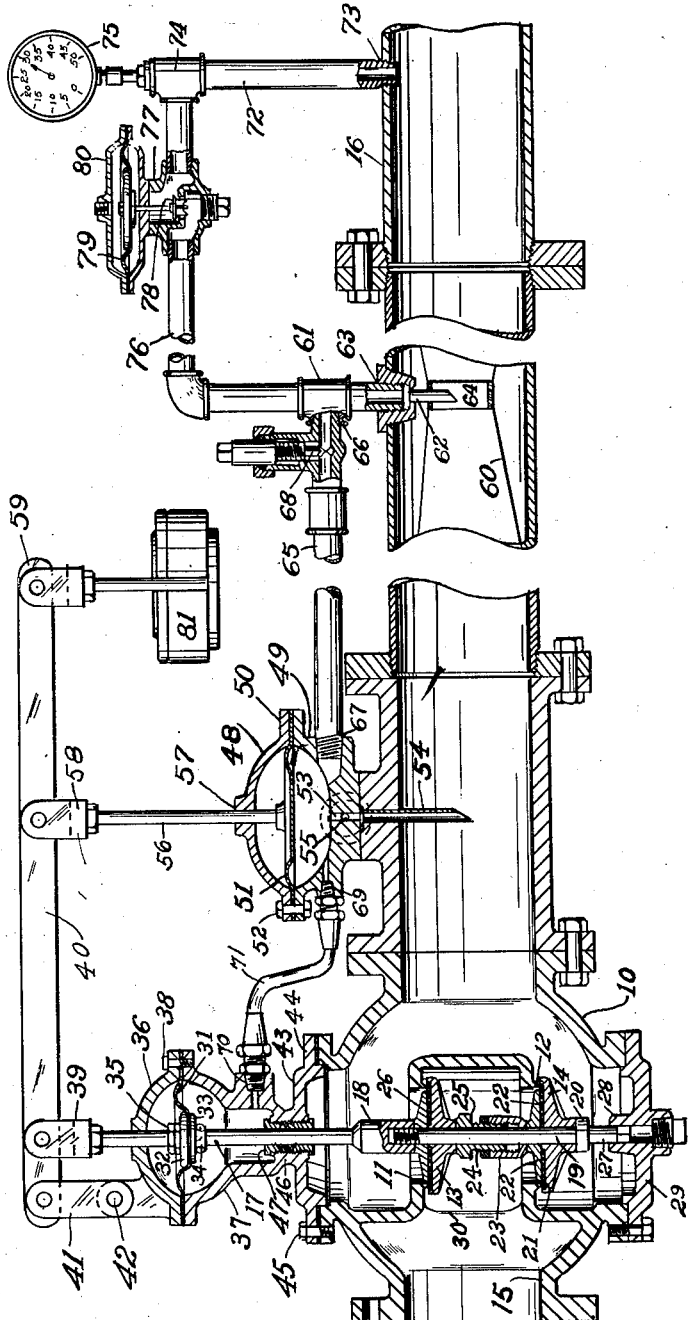
Inventor
*Ralph C. Hughes*
By *Frank D. Gray*
Attorney

Patented Aug. 15, 1933

UNITED STATES PATENT OFFICE 1,922,954

FLUID PRESSURE REGULATOR

Ralph C. Hughes, Anderson, Ind., assignor to Reynolds Gas Regulator Co., Anderson, Ind., a Corporation of Indiana Application December 30, 1931
Serial No. 583,945

7 Claims. (Cl. 50—16)

My invention relates to improvements in fluid pressure regulators and particularly to that type of regulator provided with means for automatically controlling the flow of gas or the like through a main or conduit whereby the pressure at a given point in the main is built up as the volume of gas passing that point increases.

It is an object of my invention to provide a regulator of the above type which will be effective to permit the flow of gas under normal conditions from the source of supply to the distributing main at a desired pressure, and will operate automatically in response to actuation governed by the relative pressures in the supply line and the said distributing or outlet main, to increase the pressure in the low pressure or distributing line when increased demand results in increased flow in said distributing line, whereby needed pressure in the service mains may be maintained.

It is a further and special object of my invention to provide a regulator of the above type embodying mechanisms for actuating the regulator valve and are responsive to fluid pressure in the outlet main as well as to flow in the outlet main and the resulting difference in pressure due to such velocity of flow, these mechanisms being provided wth fluid pressure connections so that the combined unit shall possess remarkable mutuality of action in controlling the regulator valve.

Other and further objects of my invention will be hereinafter set forth and the novel features pointed out in the claims.

In the drawing forming a part of this specification, I have illustrated my improvements as applied to an automatic valve structure mounted in a conduit serving to supply fluid such as gas, the drawing being a central longitudinal section of the conduit and connected tubular parts, certain detail structures being shown in elevation.

Referring to the drawing, the valve casing 10 provided with the valve seats 11 and 12 cooperate with the valves 13 and 14 which are adapted to engage said seats against pressure and to yield to reduced pressure upon the diaphragm 31 to permit flow of a fluid such as gas into the outlet main 16. The valves 13 and 14 are mounted on the lower end of a stem 17 having an enlargement 18 axially screw threaded to receive therein the threaded end of the extension 19 which is thereby made detachable from the stem proper. These valves are therefore, carried by said extension. The lower valve member 14 is fixedly mounted on said extension 19 by resting upon an integral collar or shoulder 20 of said extension, and is provided with a facing 21 clamped on said member by a plate 22 surrounding said extension.

Above the said plate 22, and surrounding the extension 19, is a nut 23 having internal threads to receive a threaded stem 24 of an adjustable elongated spindle the top portion of which has a polygonal enlargement 25 for rotation by a suitable tool. These two members 23 and 24 form an adjustable support for the upper valve member 13 which is also provided with a similar facing as that designated 21 provided for the lower member 14. The latter facing is clamped by the member 26 which in turn is engaged on its upper side by the said enlargement 18.

The stem 17 together with the extension 19 forms a complete valve stem, the lower end 27 of which is guided in a hollow boss 28 formed on the inner face of a cover 29 closing the bottom of the casing 10. The said casing is also provided with a hand opening 30, normally closed, to permit access to the valve. The upper end of the stem 17 is secured to a flexible diaphragm 31 by means of a pair of clamping plates 32 and 33 receiving the stem therethrough, and positioned upon a lower nut 34 on the stem and clamped down thereagainst by a nut 35 adjustable on the stem.

The diaphragm 31 is clamped between the annular flanges of the two sections 36 and 37 of the diaphragm casing, which sections are bolted together, as shown at 38. The upper end of the stem extends upward through the section 36 of the casing and is provided with a fork 39 in which is pivotally connected a counter-weighted lever 40 fulcrumed at one end by the link 41 at 42 upon the casing section 36. The lower section 37 of the diaphragm casing is integral with a detachable cover 43 for the valve casing 10, the cover flanges 44 being bolted at 45 to such casing. Between the cover and upper portion of the section a reduced throat 46 is formed for guide nuts 47.

The construction above described has been found especially serviceable for proper relative adjustment of the valve members 13 and 14 relative to their respective valve seats and to each other. It is evident that the lower member 14 may be adjusted relative to its seat 12 by adjusting the stem extension 19, and that after the lower member has been adjusted, the upper valve member 13 may then be adjusted to its seat 11 by manipulation of the threaded nuts 23 and 24 to raise or lower the valve member 13 with respect to its seat so that both valve members may be adjusted to insure a uniform seating.

It is important to note also that this adjustment of the valve members may be readily made without the necessity of disassembling the valve parts, when adjustment is necessary, through the hand opening 30, and that by removing the cover 29 such valve members may be removed from position through the bottom opening for the purpose of repair and without the necessity of disconnecting the valve as a unit from the line.

My improved construction includes an auxiliary diaphragm casing 50 mounted upon the outlet main conveniently adjacent the main diaphragm 31 and comprising upper and lower sections 48 and 49 respectively, between whose annular flanges the diaphragm 51 is clamped, the sections being bolted together at 52. The lower section 49 communicates with the outlet line by the lower aperture 53 and a hollow tube 54 inserted into the outlet pipe. A controlling needle valve 55 is provided for the aperture.

A stem 56 is connected to said diaphragm 51 and is movable through the aperture 57 in the upper section 48. This stem is also pivoted to the lever bar 40 by the fork 58 positioned intermediate the fork 39 and the weight end 59 of the lever. The vertical movement of the stem 56 is therefore responsive to variations in pressure in the outlet main.

As a further factor of control of the regulator valve, and one which shall be especially responsive to the effect of increased flow in the distributing line, I have incorporated in my regulatory system, a Venturi element 60 positioned in the outlet main 16, and have provided an outer tubular fitting 61 having a downwardly extending hollow stem 62 inserted into said main at 63 and projected into the throat 64 of said venturi. The said fitting 61 receives a pipe 65 by threaded connection 66, the lower casing section 49 being provided with a threaded opening 67 for receiving the threaded opposite end of the pipe 65, to provide communication between the casing section and the venturi, whereby increased rate of flow in the latter, will influence the diaphragm 51 and thereby the lever bar 40.

A control valve 68 is provided in the pipe 65 and may be of the needle type. The casing section 49 is further provided with a threaded aperture 69 and the lower casing section 37 is provided with a threaded aperture 70 for the purpose of providing a tubular element 71 communicating with the said casing sections, the ends of the element 71 being threaded for connection with the apertures 69 and 70. This construction therefore provides a differential control of the stem 17 and the regulator valve, measured by the pressure in the outlet main, and the velocity of flow in the outlet main, by both diaphragms 31 and 51.

A tubular element 72 is also provided having threaded connection at 73 with the outlet main 16, and provided at its upper end with a fitting 74 upon which is mounted a gauge 75 and thereby connected with the outlet main. Pipe connection is made between the fittings 61 and 74 including a horizontal section 76 provided with an auxiliary control 77 comprising valve 78 and controlling diaphragm 79 mounted in the casing 80.

This construction in which the auxiliary regulator is mounted provides convenient attachment for the gauge and communication with the throat of the Venturi 60, and at the same time presents suitable opportunity for connections between the lower diaphragm casing section 49 with the section 76, as well as with the lower casing section 37 of the main control diaphragm casing. The Venturi tube 60 affords the usual means for increasing the effect of the velocity of flow. It is used for multiplying the effect of the differential pressure in the outlet main 16, and thereby influencing the diaphragm 51 and from it the lever 40 to which the stem 56 is connected at a relatively long distance from the fulcrum, and so exerts a control action upon the main regulator valve.

The diaphragm 51 is therefore responsive to differences in pressure in the outlet main at points reached by the tubes 54 and 62 respectively. These tubes having an oblique plane of cut at their inner ends, tend by a certain suction by reason of the flow of gas in the outlet main, to decrease the pressure in the casing section 49, and thereby influence the fork 58 to drop and so tend to open the regulator valve. The flow through the throat 64 of the Venturi tube tends to increase the suction through tubes 62 and 65 and thereby further reduce pressure beneath the diaphragm 51. It will be understood that stem 62 associated with the Venturi tube measures pressure in the main at a point some distance beyond the casing 50, though both stems 54 and 62 are in communication with the diaphragm 51.

In setting up the system illustrated in the drawing, the lever 40 is weighted at 81 to control the main regulator valve 13—14 to permit sufficient flow of fluid therethrough to supply normal or ordinary demands of consumption. The automatic action of the system will then be as described below.

If now, the arm 40 is weighted at 81 sufficiently to tend to open the valve 13—14, entrance of the fluid through said valve tends to oppose such movement, and if adequate, will close the valve. The latter movement will raise the stem 17 and with it the diaphragm 31 relieving the pressure in the lower casing section 37, such relief by expansion being balanced more or less by communication between the chambers 37 and 49 through the tube 71. Communication of the chamber 49 with the outlet main 16 through the tube 54 and aperture 53 moves the diaphragm 51 and stem 56 responsive to the relatively lower pressure in said outlet main, but is effective to balance the force of the stem 17 by reason of the relative lengths of lever arms to which these stems are connected.

When however, reduction in pressure in the outlet communicating with the stem 54 is sufficient and the stem 56 begins to descend by reason of such reduction, the valve 13—14 will be opened further by actuation of the lever 40, until connection of the tube 53 with the tube 54 in the outlet main 16 will react to increase the pressure in the chamber 49 and exert an upward force on the stem 56 to overcome the effect of the weights 81 and return the valve 13—14 to a balanced position, and the demand of consumption is met by the flow of fluid passing said valve. The inlet opening is designated 15.

Unusual or increased demand in the outlet main 16 will correspondingly increase the flow through the throat 64 and decrease the pressure in the tube 62 as well as at 65, which in turn will decrease the pressure in the lower chamber 49 and again open the valve 13—14. The composite action of forces impelled by communication between the Venturi tube, the chamber 49 and chamber 37, renders a mutual controlling effect on the stem 17—19 resulting in a balanced condition as sensitive as it is positive and effective.

In my improved construction, the regulator valve 13—14 is movably controlled by the diaphragms 31 and 51, but undesirable pulsation of such diaphragms are almost wholly eliminated by the connection made by tubes 65 and 71, the lower chamber 49 being in direct communication with the lower chamber 37 which results in gradual adjustment of the diaphragm 31 in response to variations in pressure at this as well as the diaphragm 51. The tube 71 permits therefore, an exceedingly desirable equalizing and balancing effect in the connected chambers which finally results in a complete balance which will be steady and continuous until a decisive change in pressure occurs.

It is evident that when the valve 55 is closed, the diaphragm 51 will be responsive to pressure at 64 and in the chamber 37; while if the valve 55 be open and the valve 68 closed, diaphragm 51 will be responsive to pressure variations at 54 and 37 only. My combined structure therefore provides in small compass automatic control of the regulator valve as influenced by pressure in the outlet main and at a point positioned some distance from the first and there measured by flow through a Venturi tube; and that either of these pressure actuated devices may be used without the other, or both may be connected together to influence the main diaphragm in controlling the regulator valve.

My system for automatic control of the regulator valve governing the flow from the high to the low pressure mains has a high range of pressure regulation and is responsive both to the usual pressure in the outlet main and also to the velocity of flow in the latter. It is evident that changes in details of construction may be made without departing from the spirit of my invention, and I do not therefore limit myself to any form or arrangement of parts, except as indicated in the appended claims.

Having now described my invention and set forth its merits, what I claim, and desire to secure by Letters Patent, is—

1. The combination with a conduit of regulating means for automatically maintaining a constant pressure in the conduit on the outlet side of the regulator, pressure responsive means for controlling said regulating means, a second pressure responsive means connected to said conduit on the low pressure side, means connecting the two said pressure responsive means together for controlling said regulating means, and tubular means outside the said conduit for connecting the two pressure responsive means for equalizing the pressure in both said pressure responsive means, to balance the resulting effective pressure controlling said regulating means.

2. The combination with a conduit of regulating means for automatically maintaining a constant pressure in the conduit on the outlet side of the regulator, pressure responsive means for controlling said regulating means, a second pressure responsive means connected to said conduit on the low pressure side, mechanical connections between the two said pressure responsive means for controlling said regulating means, a Venturi tube device in said conduit on the low pressure side of said second pressure responsive means beyond the latter, and tubular connections between said second pressure responsive means and the first pressure responsive means on the one hand, and between said second pressure responsive means and the said Venturi tube on the other, to balance the resulting effective pressure controlling said regulating means.

3. In an apparatus of the character described the combination of high and low pressure mains, valve means controlling the passage between said mains, a regulator device including a diaphragm for controlling said valve means, a diaphragm casing mounted upon said outlet main, a pressure responsive diaphragm in said casing, lever means forming a mechanical connection between said casing diaphragm and said regulator device for cooperatively controlling said valve means, a Venturi tube positioned within said outlet main beyond said valve means, and tubular connections between said diaphragm casing and said Venturi tube and with said regulator device.

4. In an apparatus of the character described the combination of high and low pressure mains, valve means controlling the passage between said mains, a regulator device including a diaphragm for controlling said valve means, a diaphragm casing mounted upon said outlet main, a pressure responsive diaphragm in said casing and tubular connection between said casing and the outlet main, lever means forming a mechanical connection between said casing diaphragm and said regulator device for cooperatively controlling said valve means, a Venturi tube positioned within said outlet main beyond said valve means, and tubular connections between said diaphragm casing and said Venturi tube and with said regulator device.

5. In an apparatus of the character described the combination of high and low pressure mains, valve means controlling the passage between said mains, a regulator device including a diaphragm for controlling said valve means, a diaphragm casing mounted upon said outlet main, a pressure responsive diaphragm in said casing and tubular connection between said casing and the outlet main, mechanical connections between said casing diaphragm and said regulator device for controlling said valve means, a Venturi tube positioned in said outlet main, and tubular connections between said diaphragm casing and said Venturi tube for influencing the said casing diaphragm and thereby controlling said valve means through the intermediacy of said mechanical connections.

6. In an apparatus of the character described the combination of high and low pressure mains, valve means controlling the passage between said mains, a regulator device including a diaphragm for controlling said valve means, a diaphragm casing mounted upon said outlet main and having apertured communication with the latter, a pressure responsive diaphragm in said casing, a Venturi tube positioned within said outlet main, vertical stems secured to said diaphragms in spaced relation, mechanical connections for controlling said stems for thereby controlling said valve means in conformity with the differential pressure effective upon said diaphragms, and tubular connections outside said mains and connecting said diaphragm casing with said Venturi tube and with said regulator device.

7. The combination with a conduit of a regulating pressure operated valve therein, a diaphragm casing mounted upon said conduit on the outlet side of said valve and having apertured communication with said outlet side of the conduit, a Venturi tube positioned in the latter beyond diaphragm casing, a pressure meter mounted on said conduit beyond said Venturi tube, tubular means communicating with said diaphragm casing, with the throat of said Venturi tube and with said meter, a pressure responsive diaphragm in said casing, and mechanical connections between said diaphragm and said valve controlled both by the inlet pressure in said conduit, the pressure in the conduit on the outlet side of the valve, and the rate of flow through said Venturi tube.

RALPH C. HUGHES.